United States Patent
Don et al.

(10) Patent No.: US 9,927,979 B1
(45) Date of Patent: Mar. 27, 2018

(54) DATA COMPRESSION USING CONSTANT NUMBER-OF-TRACK-GROUPS AND THIN PROVISIONING CLONE TARGET

(75) Inventors: Arieh Don, Newton, MA (US); Alexandr Veprinsky, Brookline, MA (US); Jeremy J. O'Hare, Westborough, MA (US); John T. Fitzgerald, Mansfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1699 days.

(21) Appl. No.: 13/363,893

(22) Filed: Feb. 1, 2012

(51) Int. Cl.
*G06F 15/16* (2006.01)
*G06F 3/06* (2006.01)
*G06F 17/30* (2006.01)

(52) U.S. Cl.
CPC .......... *G06F 3/0608* (2013.01); *G06F 3/0626* (2013.01); *G06F 17/3015* (2013.01)

(58) Field of Classification Search
CPC ...... G06F 3/0608; G06F 3/0647; G06F 3/067; G06F 17/30153; G06F 2211/1014; G06F 3/0605; G06F 3/0626; G06F 3/0644
USPC .................. 711/114, 162, 171, 163; 707/813
See application file for complete search history.

(56) References Cited

U.S. PATENT DOCUMENTS

| | | | |
|---|---|---|---|
| 2010/0235597 A1* | 9/2010 | Arakawa | G06F 3/0605 711/163 |
| 2010/0299491 A1* | 11/2010 | Ueda | 711/162 |
| 2011/0107052 A1* | 5/2011 | Narayanasamy | G06F 3/0608 711/171 |
| 2011/0307529 A1* | 12/2011 | Mukherjee et al. | 707/813 |
| 2012/0005423 A1* | 1/2012 | Zhuang et al. | 711/114 |
| 2012/0131293 A1* | 5/2012 | Benhase et al. | 711/162 |
| 2013/0151770 A1* | 6/2013 | Hara et al. | 711/114 |

* cited by examiner

*Primary Examiner* — Dustin Nguyen
(74) *Attorney, Agent, or Firm* — Anderson Gorecki LLP

(57) ABSTRACT

For a data copying operation, data compression using constant number-of-track-groups and a thinly provisioned target device facilitates incremental updates where the size of the compressed data on the target device changes. Compressed data is written to the same LBA as the beginning of the source device chunk cluster LBA (1:1 mapping of data start). A termination string or other demarking device is used to identify space freed on the target device resulting from compression. During an incremental update only changed chunk clusters are changed, and freed space is changed accordingly if necessary.

21 Claims, 7 Drawing Sheets

DATA COMPRESSION USING CONSTANT NUMBER-OF-TRACK-GROUPS AND THIN PROVISIONING CLONE TARGET

CROSS-REFERENCE TO RELATED APPLICATIONS

NA

BACKGROUND OF THE INVENTION

The invention is generally related to data storage systems. Enterprises often rely on data storage systems to support business operations. The data storage systems are typically connected to a network and may be geographically distributed. Various technologies have been developed to satisfy common requirements such as data compression, timely access to data, data security and data integrity. Other technologies have been developed to satisfy somewhat more specialized requirements associated with large data sets. Aspects of the present invention improve device cloning storage requirements, but have broader applicability to storage requirements associated with data copying.

SUMMARY OF THE INVENTION

The inventors have recognized that thin provisioning and compression can be used with device cloning. The inventors have also recognized that prior art techniques will not practically allow this because, among other things, the solution for reusing the storage capacity saved by compression violates the 1:1 source-to-target device relationship constraint of device cloning. A thinly provisioned target device is paired 1:1 with a thickly provisioned source device. Chunks of data, or clusters of chunks, from the source device are moved to the thinly provisioned target device. The data may be compressed before being written to the target device. Further, the start location of each chunk or cluster on the source device is used to determine the start location of the corresponding compressed data on the thin target device.

In accordance with an aspect of the invention, a method comprises: for a source device characterized by a plurality of data groupings, configuring a thinly provisioned target device with corresponding data groupings; copying the source device data groupings to the target device; compressing at least some of the data groupings on the target device; and updating and compressing at least one of the groupings on the target device independent of other groupings on the target device.

In accordance with an aspect of the invention, a computer program stored on a non-transitory medium comprises: for a source device characterized by a plurality of data groupings, logic for configuring a thinly provisioned target device with corresponding data groupings; logic for copying the source device data groupings to the target device; logic for compressing at least some of the data groupings on the target device; and logic for updating and compressing at least one of the groupings on the target device independent of other groupings on the target device.

In accordance with an aspect of the invention, an apparatus comprises: a source data storage device characterized by a plurality of data groupings; a thinly provisioned target data storage device configured with corresponding data groupings; and computer program code for copying the source device data groupings to the target device, compressing at least some of the data groupings on the target device, and updating and compressing at least one of the groupings on the target device independent of other groupings on the target device.

DETAILED DESCRIPTION

In accordance with aspects described below, thin provisioning and compression are used with device cloning. In this description 1 block is 512 bytes, 1 sector is 16 blocks, and 1 track is 64 kbytes. However, these conventions are used only to provide context and should not be viewed as limiting the scope of the invention. Further, certain aspects of the invention may be implemented with a computer program stored on non-transitory memory and utilized by a processor.

Figure 1:
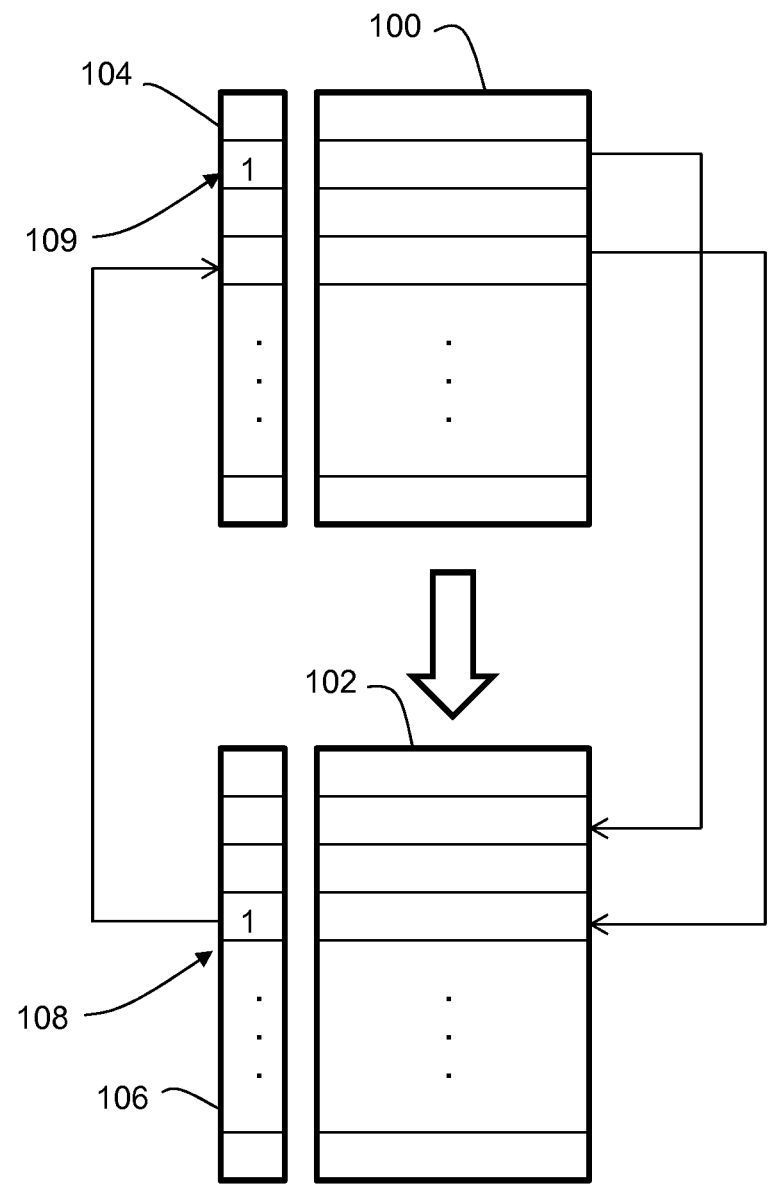
FIG. 1 illustrates device cloning.

Referring to FIG. 1, one technology that was developed to meet specialized requirements associated with large data sets is device cloning. Device cloning was developed to more efficiently copy of a large set of data from a source device 100 to a target device 102 to provide a sandbox copy to test programs for managing Y2K problems. Although data cloning creates a copy much faster than previous technologies such as tape backup, it still takes considerable time to create a new copy. This was found to be somewhat problematic because both the source and target data might be substantially modified over time. Consequently, a field 104 associated with the source data and a corresponding field 106 associated with the target data are used to indicate which data has been modified since the most recent cloning operation. In particular, dirty bits 108, 109 (created when new data is written) are set to indicate which tracks have been modified on each device 100, 102, respectively. In order to update the copy on the target device with the current data of the source device, the dirty bits associated with the target copy are merged with the dirty bits of the source copy and each source copy track for which a dirty bit is set is copied to the target device.

Figure 2:
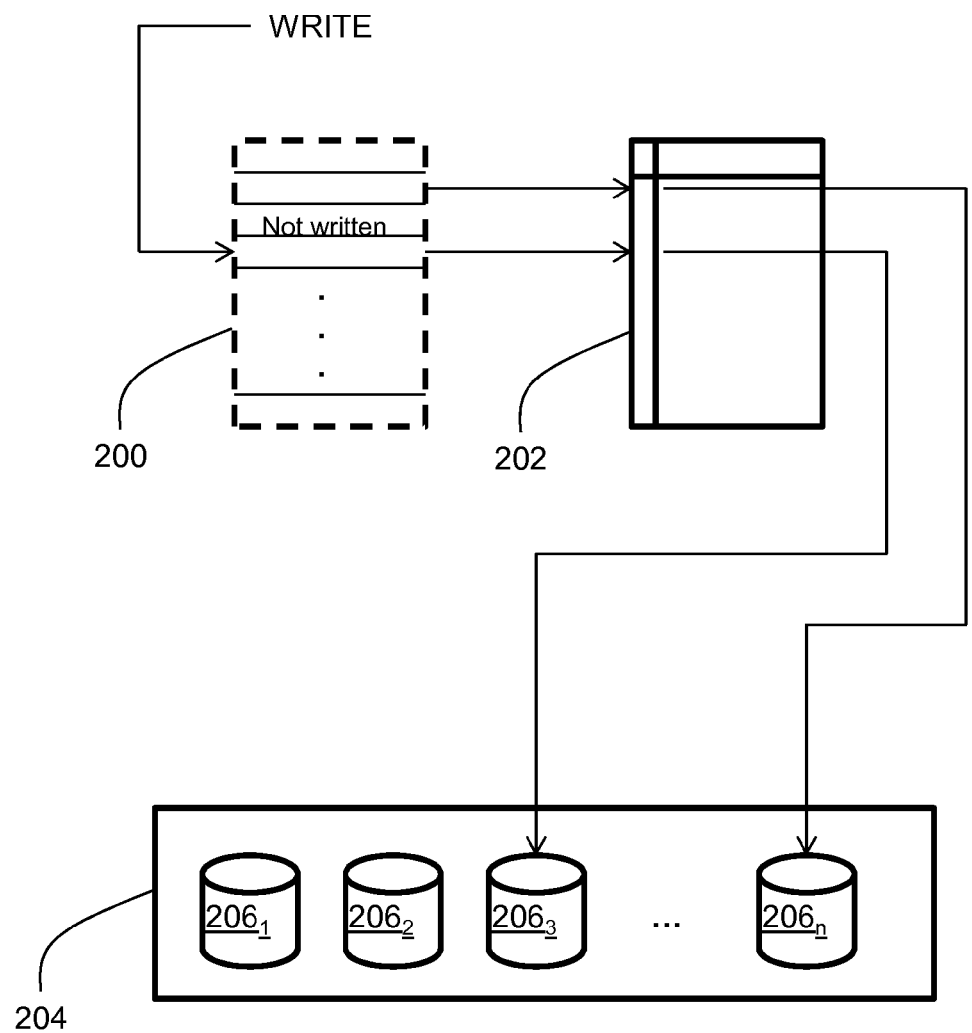
FIG. 2 illustrates thin provisioning.

Referring to FIG. 2, another technology that was developed to meet the more specialized requirements associated with large data sets is "thin provisioning." A "thickly provisioned" device of capacity n blocks has n blocks of actual storage capacity. In contrast, a "thinly provisioned" device of capacity n blocks may have less than n blocks of actual storage capacity. Further, the actual storage capacity of the thinly provisioned device may be incrementally increased. The thinly provisioned device includes a virtual device 200 associated with a pointer table 202 and a data pool 204 of logical volumes $206_1$-$206_n$. In response to an IO such as a WRITE, the virtual device 200 looks for a pointer entry in the table 202 associated with the address indicated by the IO. The pointer indicates where to find the data in the data pool 204. The WRITE is then performed. If the IO is a WRITE and no pointer is found, storage space is allocated in data pool 204 and a pointer entry is made in the table 202 pointing to the allocated space. This technology is useful where data storage capacity requirements may increase over time to a large size, but partition size or filesystem configuration would otherwise require initial purchase of too much storage capacity that might not be utilized until well into the future.

Figure 3:
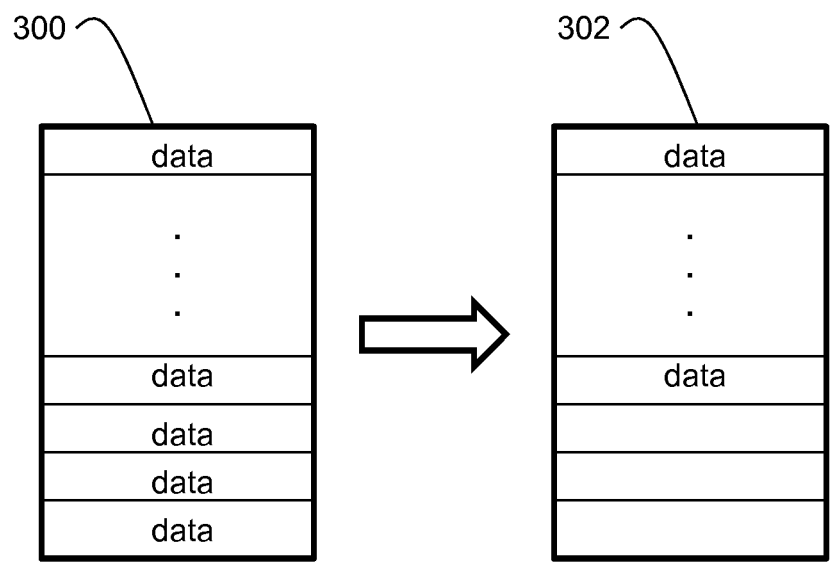
FIG. 3 illustrates data compression.

Referring to FIG. 3, data compression typically involves using an algorithm to recognize patterns in a data set and generate a more compact representation based on the recognized patterns. Compression efficiency is a function of multiple variables, but on average it might be found that the compressed data is about 20% smaller in size than the inflated source data. There may be little advantage to compressing data from a source device 300 to a target device 302 of the same capacity if the gain from the compression is left unused.

Figure 4:
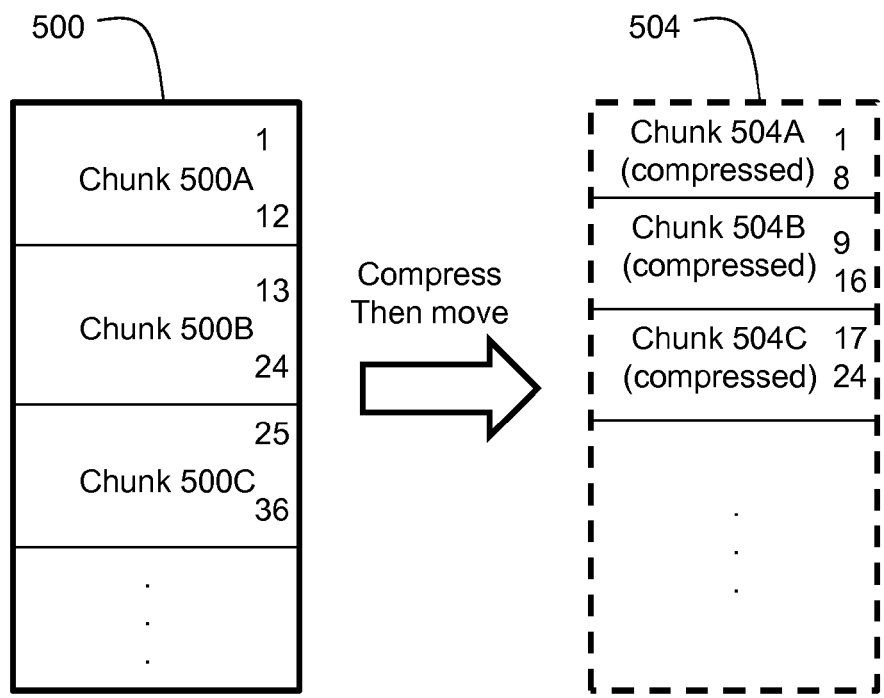
FIGS. 4 and 5 illustrate data compression with a thinly provisioned clone target.

One embodiment of device cloning with thin provisioning and compression is illustrated in FIG. 4. A thickly provisioned source device 500 includes chunks of 12 tracks, e.g., chunk 500A at tracks 1 through 12, chunk 500B at tracks 13 through 24, etc. The chunks of data from the source device are compressed then copied to a thinly provisioned target device 504. Thus, the thinly provisioned target device includes compressed chunk 504A, which could occupy tracks 1 through 8, compressed chunk 504B, which could occupy tracks 9 through 16, etc. However, complications can arise if recompressed data exhibits a change in size.

Figure 5:
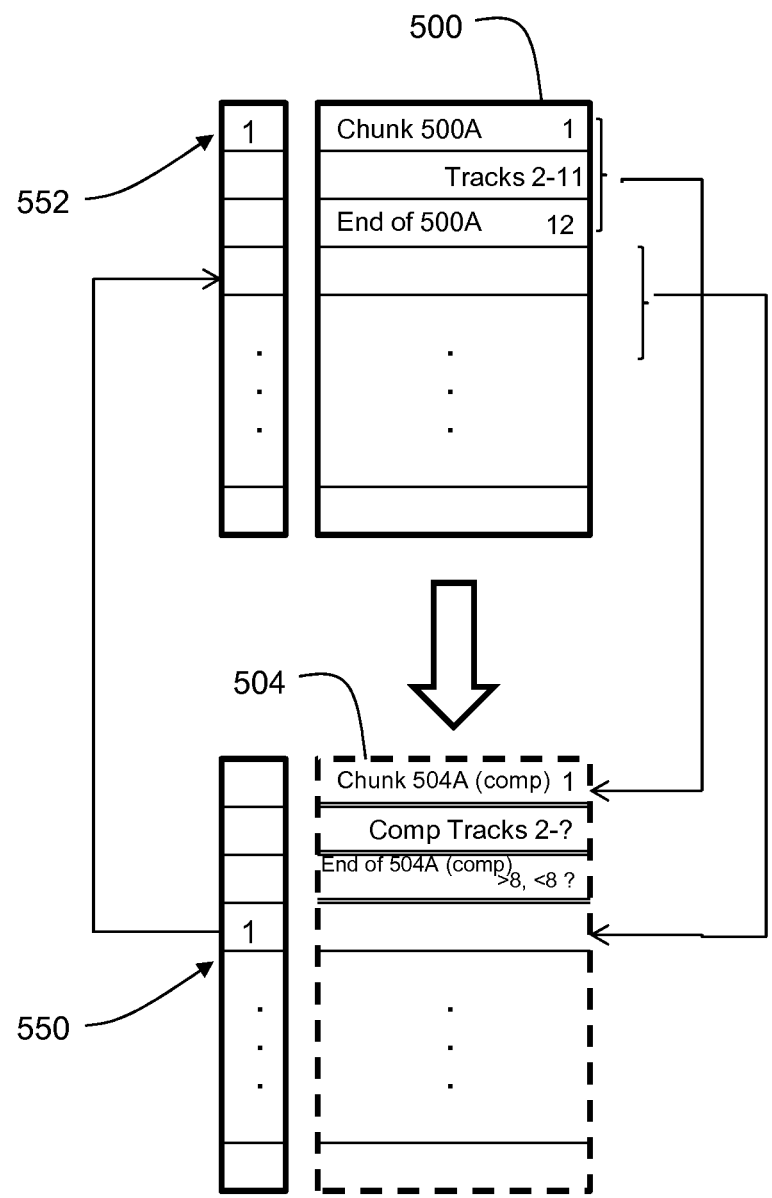

Referring to FIG. 5, when WRITEs are performed, dirty bits are set, e.g., dirty bits 550, 552. When recompressing, the dirty bits are merged and chunks associated with dirty tracks are recompressed and copied to the thin target device 504. Such incremental recompression enables thin provisioning and compression to be used with data cloning. However, if an updated recompressed chunk such as chunk 504A is smaller after the update then there are unused tracks on device 504. For example, an unused track "hole" is created in the target device, e.g., where chunk 504A (recompressed) occupies only tracks 1 through 6 after update rather than 1 through 8. Furthermore, if an updated recompressed chunk such as chunk 504A is larger than it was previously after the update then there is insufficient space in chunk 504A (compressed) so the recompressed chunk must be relocated somewhere else on the device where sufficient space is available and a pointer to it must be created. For example, if chunk 500A changes and chunk 504A (recompressed) would occupy tracks 1 through 9 on device 504 rather than 1 through 8 then there is insufficient space where chunk 504A (compressed) was previously stored. It would be advantageous to mitigate the overhead associated with relocation and pointer creation and management.

Figure 6:
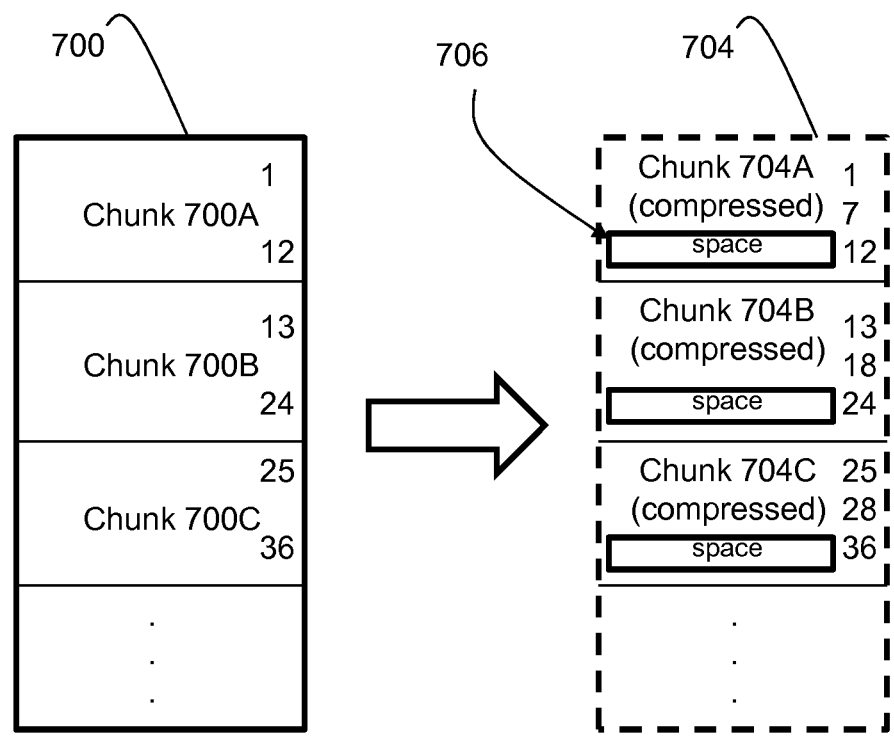
FIGS. 6 and 7 illustrate data compression using a constant number-of-track-groups and thinly provisioned clone target.

A solution to the problem described with respect to FIGS. 4 and 5 is illustrated in FIG. 6. A thickly provisioned source device 700 includes chunks of 12 tracks, e.g., chunk 700A at tracks 1 through 12, chunk 700B at tracks 13 through 24, etc. The chunks of data from the source device are compressed then copied to a thinly provisioned target device 704. However, for each chunk in the source device an equivalent storage capacity in the thinly provisioned target device is reserved. Thus, the thinly provisioned target device includes compressed chunk 704A, which has access to tracks 1 through 12 but only occupies tracks 1 through 7, compressed chunk 704B, which has access to tracks 13 through 24 but only occupies tracks 13 through 18, etc. However, in order to accommodate possible data size changes corresponding addresses are used for corresponding chunks of data. In other words, the start location of data on the thick source device is used to determine the start location of the corresponding compressed data on the thin target device. A space 706 remains where savings is realized due to data compression, e.g., tracks 8 through 12 on the target device. Since the space is thinly provisioned it can be allocated, deallocated, or never allocated in the thinly provisioned device as required. Consequently, storage space freed by compression can be reused, and changes in chunk size as a result of update can be more readily accommodated by the thinly provisioned target device. More particularly, if a chunk is larger after update and recompression then the space is utilized to accommodate the size increase, i.e., the size of the space decreases (storage needs to be allocated from the data pool). Similarly, if a chunk is smaller after update and recompression then the space is utilized to accommodate the size decrease, i.e., the size of the space increases (storage is being returned to the storage pool).

The space 706 can be referenced in any of various ways. For example, and without limitation, a termination string could be used to demark the space. Other techniques for demarking space are known in the art.

It should be noted that it is not necessary for all of the data on the thin target to be compressed. For example, it may be preferable to store relatively uncompressible data in uncompressed form on the target device. Indicators for each chunk in the target device may be used to identify which chunks are uncompressed.

Figure 7:
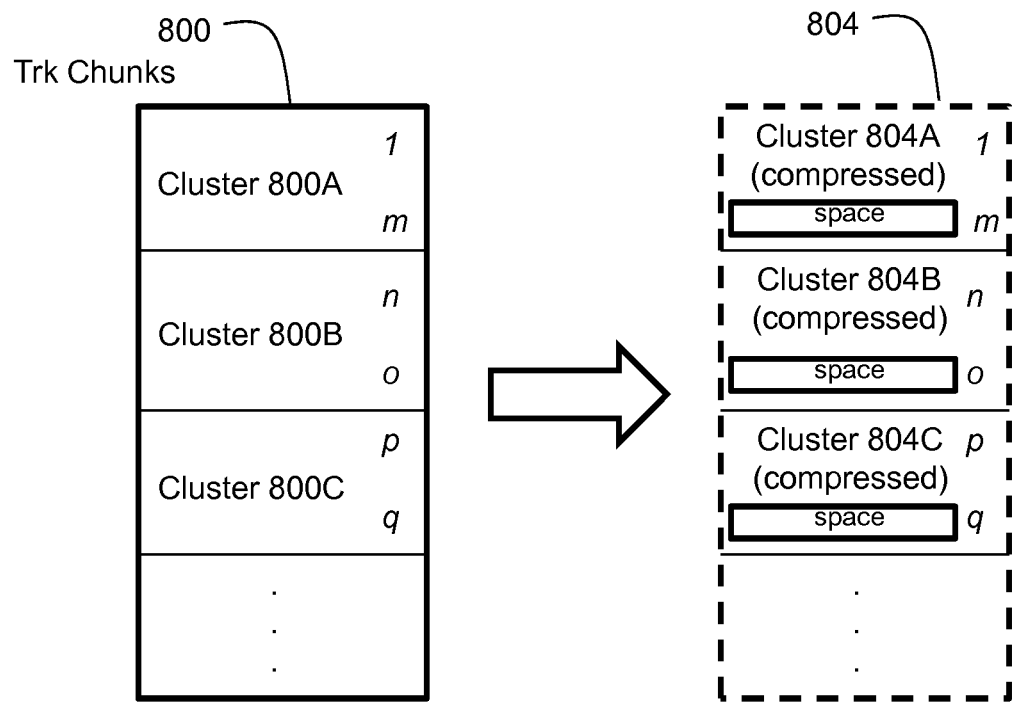

FIG. 7 illustrates another alternative embodiment. In this alternative embodiment data is compressed on a per chunk cluster basis, where chunk size is constant. A thickly provisioned source device 800 includes clusters 800A, 800B, 800C. For each cluster in the source device an equivalent storage capacity in the thinly provisioned target device 804 is reserved. Thus, the thinly provisioned target device includes compressed clusters 804A, 804B, 804C. The size of the chunk cluster is a design choice that will be understood by those skilled in the art. Generally, the chunk cluster size will be selected as a tradeoff such that sufficient storage space savings is realized from compression and that overhead associated with recompression is not too large.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method comprising:
   for a source device characterized by a plurality of data groupings, configuring a thinly provisioned target device with corresponding data groupings;
   copying the source device data groupings to the target device; compressing at least some of the data groupings on the target device; and updating and compressing at least one of the data groupings on the target device independent of other data groupings on the target device.

2. The method of claim 1 including configuring the thinly provisioned target device such that for each data grouping in the source device an equivalent storage capacity in the thinly provisioned target device is provided.

3. The method of claim 2 including configuring the thinly provisioned target device such that corresponding addresses are provided for corresponding data groupings on the source and target devices.

4. The method of claim 1 including utilizing start location of each data grouping on the source device to determine a start location of the corresponding data grouping on the thinly provisioned target device.

5. The method of claim 1 wherein for at least one data grouping a space is formed on the target device where savings is realized due to data compression, and including demarking that space.

6. The method of claim 5 including allocating, deallocating, or never allocating the space.

7. The method of claim 5 including changing space size in response to a change in grouping size on the target device.

8. A computer program stored on a non-transitory medium comprising:
for a source device characterized by a plurality of data groupings, logic for configuring a thinly provisioned target device with corresponding data groupings;
logic for copying the source device data groupings to the target device; logic for compressing at least some of the data groupings on the target device; and logic for updating and compressing at least one of the data groupings on the target device independent of other data groupings on the target device.

9. The computer program of claim 8 including logic for configuring the thinly provisioned target device such that for each data grouping in the source device an equivalent storage capacity in the thinly provisioned target device is provided.

10. The computer program of claim 9 including logic for configuring the thinly provisioned target device such that corresponding addresses are provided for corresponding data groupings on the source and target devices.

11. The computer program of claim 8 including logic for utilizing start location of each data grouping on the source device to determine a start location of the corresponding data grouping on the thinly provisioned target device.

12. The computer program of claim 8 wherein for at least one data grouping a space is formed on the target device where savings is realized due to data compression, and including logic for demarking that space.

13. The computer program of claim 12 including logic for allocating, deallocating, or never allocating the space.

14. The computer program of claim 12 including logic for changing space size in response to a change in grouping size on the target device.

15. An apparatus comprising:
a source data storage device characterized by a plurality of data groupings; a thinly provisioned target data storage device configured for corresponding data groupings; and
computer program code for copying the source device data groupings to the target device, compressing at least some of the data groupings on the target device, and updating and compressing at least one of the data groupings on the target device independent of other data groupings on the target device.

16. The apparatus of claim 15 wherein the thinly provisioned target device is configured such that for each data grouping in the source device an equivalent storage capacity in the thinly provisioned target device is provided.

17. The apparatus of claim 16 wherein the thinly provisioned target device is configured such that corresponding addresses are provided for corresponding data groupings on the source and target devices.

18. The apparatus of claim 15 wherein a start location of each data grouping on the source device is used to determine a start location of the corresponding data grouping on the thinly provisioned target device.

19. The apparatus of claim 15 wherein for at least one data grouping a space is formed on the target device where savings is realized due to data compression, and wherein that space is demarked.

20. The apparatus of claim 19 wherein the space is allocated, deallocated, or never allocated.

21. The apparatus of claim 19 wherein space size is changed in response to a change in grouping size on the target device.

* * * * *